United States Patent
Lee et al.

(10) Patent No.: US 9,717,007 B2
(45) Date of Patent: Jul. 25, 2017

(54) APPARATUS AND METHOD FOR DETERMINING NETWORK STATUS

(71) Applicant: Samsung Electronics Co., Ltd., Suwon-si, Gyeonggi-do (KR)

(72) Inventors: Sun-Kee Lee, Seongnam-si (KR); Sung-Hyuk Shin, Seongnam-si (KR); Myung-Su Kang, Seoul (KR); Sung-Ho Son, Daegu (KR); Heung-Sik Shin, Jeonju-si (KR); Su-Ha Yoon, Seoul (KR); Soon-Hyun Cha, Anyang-si (KR); Sun-Min Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 14/931,139

(22) Filed: Nov. 3, 2015

(65) Prior Publication Data
US 2016/0127924 A1    May 5, 2016

(30) Foreign Application Priority Data
Nov. 4, 2014  (KR) .................. 10-2014-0152402

(51) Int. Cl.
| | |
|---|---|
| *H04W 24/02* | (2009.01) |
| *H04L 12/26* | (2006.01) |
| *H04W 24/04* | (2009.01) |
| *H04W 84/12* | (2009.01) |

(52) U.S. Cl.
CPC ........... *H04W 24/02* (2013.01); *H04W 24/04* (2013.01); *H04L 43/0811* (2013.01); *H04W 84/12* (2013.01)

(58) Field of Classification Search
CPC ..... H04W 24/02; H04W 24/04; H04W 84/12; H04L 43/0811
See application file for complete search history.

(56) References Cited

U.S. PATENT DOCUMENTS

| | | | |
|---|---|---|---|
| 8,479,263 B1 | 7/2013 | Liu et al. | |
| 8,634,821 B2 * | 1/2014 | Raleigh | H04L 41/0806 455/419 |
| 2008/0195732 A1 * | 8/2008 | Maruyama | H04L 12/2602 709/224 |
| 2009/0116447 A1 | 5/2009 | Balasubramanian et al. | |
| 2011/0110332 A1 * | 5/2011 | Kim | H04W 36/0016 370/331 |

(Continued)

FOREIGN PATENT DOCUMENTS

| | | |
|---|---|---|
| KR | 10-2005-0072686 A | 7/2005 |
| KR | 10-2013-0026480 A | 3/2013 |

*Primary Examiner* — Brian D Nguyen
(74) *Attorney, Agent, or Firm* — Jefferson IP Law, LLP

(57) ABSTRACT

A method for determining a network status is provided. The method includes obtaining a period determined by a first processor of an electronic apparatus, using a second processor of the electronic apparatus, transmitting a preset message from the electronic apparatus to another apparatus in a network according to the determined period, using the second processor, determining the network status based on at least one of (i) whether or not a response to the preset message is received and (ii) information included in the response, using the second processor, and when the network status is determined to be abnormal, activating the first processor using the second processor.

23 Claims, 7 Drawing Sheets

(56) References Cited

U.S. PATENT DOCUMENTS

| | | | | |
|---|---|---|---|---|
| 2012/0036286 A1* | 2/2012 | Torigoe | ............ | G06F 13/38 |
| | | | | 710/22 |
| 2012/0185554 A1* | 7/2012 | Torigoe | ............ | G06F 13/28 |
| | | | | 709/212 |
| 2014/0222998 A1* | 8/2014 | Vasseur | ............ | H04L 41/16 |
| | | | | 709/224 |
| 2015/0012648 A1* | 1/2015 | Testin | ............ | H04L 12/283 |
| | | | | 709/224 |
| 2015/0257023 A1* | 9/2015 | Agardh | ............ | H04W 48/12 |
| | | | | 370/241 |

* cited by examiner

APPARATUS AND METHOD FOR DETERMINING NETWORK STATUS

CROSS-REFERENCE TO RELATED APPLICATION(S)

This application claims the benefit under 35 U.S.C. §119(a) of a Korean patent application filed on Nov. 4, 2014 in the Korean Intellectual Property Office and assigned Serial number 10-2014-0152402, the entire disclosure of which is hereby incorporated by reference.

TECHNICAL FIELD

The present disclosure relates to an electronic apparatus and a method for controlling at least one processor and at least one communication module. More particularly, the present disclosure relates to an electronic apparatus and a method for determining a network status.

BACKGROUND

As a result of recent developments in the area of information communication technology, an electronic apparatus has become an important means for transferring various pieces of information to users. The electronic apparatus may perform communication with other electronic apparatuses through communication modules in networks. In addition, the electronic apparatus may provide a graphic user interface (GUI) using a display for the user's convenience. The electronic apparatus may operate in a multi-processor structure that includes a processor for controlling the GUI and a processor for controlling the communication module.

For communications, the electronic apparatus may transmit data to another electronic apparatus through the communication module that is functionally connected with the electronic apparatus. When the data is received, the external electronic apparatus may transmit the data to the network for the final destination. As such, the external apparatus cannot transmit the data in the event of a malfunction, the other electronic apparatus does not have a function to inform the electronic apparatus of the current status, and the electronic apparatus may not determine the network status.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus for determining a network status of other electronic apparatuses to thereby perform another operation in the electronic apparatus.

In accordance with an aspect of the present disclosure, a method for determining a network status is provided. The method includes obtaining a period determined by a first processor of an electronic apparatus, using a second processor of the electronic apparatus, transmitting a preset message from the electronic apparatus to another apparatus in a network according to the determined period, using the second processor, determining the network status based on at least one of (i) whether or not a response to the preset message is received and (ii) information included in the response, using the second processor, and when the network status is determined to be abnormal, activating the first processor using the second processor.

In accordance with another aspect of the present disclosure, an electronic apparatus for determining a network status is provided. The electronic apparatus includes a first processor configured to determine a period for communications between the electronic apparatus and another apparatus in a network, and a second processor configured to obtain the determined period, to transmit a preset message to the other apparatus according to the determined period, to determine the network status based on at least one of (i) whether or not a response to the preset message is received and (ii) information included in the response, and to, when the network status is determined to be abnormal, activate the first processor.

An apparatus and a method according to various embodiments of the present disclosure may periodically identify the network status in a processor related to a communication module, and may report the result to an application processor. The application processor may inform the user of the network status so that user convenience related to a communication function through the network can be enhanced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
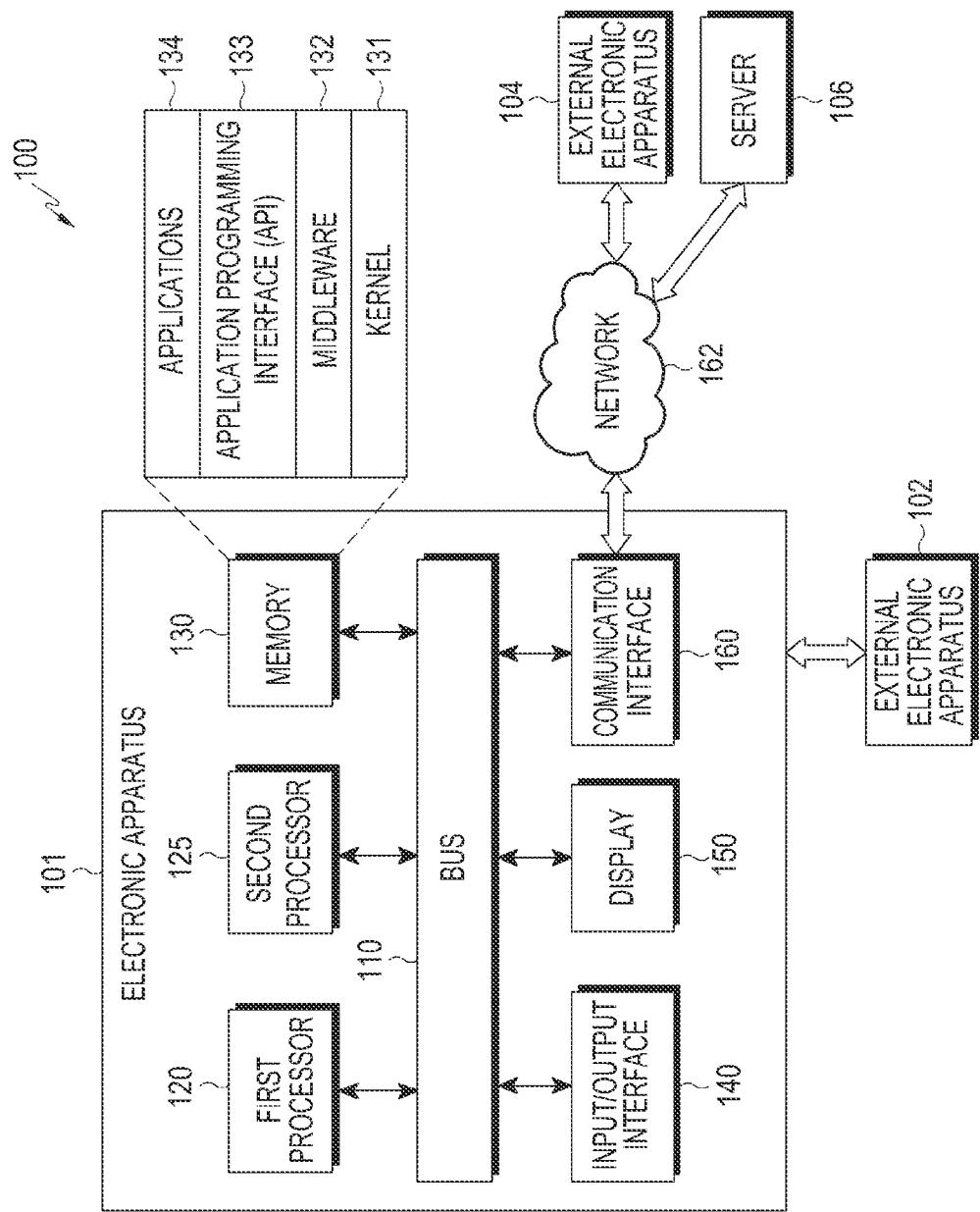
FIG. 1 is a block diagram illustrating a network environment including an electronic apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expressions "include" and/or "may include" refer to the existence of a corresponding function, operation, and/or element, and do not exclude one or more additional functions, operations, and/or elements. Also, as used herein, the terms "include" and/or "have" should be construed to denote a certain feature, number, operation, element, component and/or a combination thereof, and should not be construed to exclude the existence or possible addition of one or more other features, numbers, operations, elements, components, and/or combinations thereof.

Also, as used here, the expression "or" includes any or all combinations of words enumerated together. For example, the expression "A or B" may include A, may include B, or may include both A and B.

In the present disclosure, the expressions "a first," "a second," "the first," "the second," and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" and/or "connected" to any other element, it should be understood that not only the element may be directly coupled and/or connected to the other element, but also a third element may be interposed therebetween. Contrarily, when an element is referred to as being "directly coupled" and/or "directly connected' to any other element, it should be understood that no element is interposed therebetween.

The terms used in the present disclosure are only used to describe specific embodiments, and are not intended to limit the present disclosure.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

An electronic device according to an embodiment of the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch).

According to an embodiment of the present disclosure, an electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, Television (TV) boxes (e.g., Home-Sync™ of Samsung, Apple TV™, and/or Google TV™), game consoles, electronic dictionaries, electronic keys, camcorders, and electronic frames.

According to various embodiments of the present disclosure, the electronic device may include at least one of various medical devices (e.g., a magnetic resonance angiography (MRA), a magnetic resonance imaging (MRI), a computed tomography (CT) machine, and an ultrasonic machine), navigation devices, global positioning system (GPS) receivers, event data recorders (EDRs), flight data recorders (FDRs), vehicle infotainment devices, electronic devices for ships (e.g., navigation devices for ships, and gyro-compasses), avionics, security devices, automotive head units, robots for home and/or industry, automatic teller's machines (ATMs) in banks, and point of sales (POS) in shops.

According to an embodiment of the present disclosure, the electronic devices may include at least one of furniture, a part of a building/structure having a communication function, electronic boards, electronic signature receiving devices, projectors, and various measuring equipment (e.g., equipment for measuring a water supply, equipment for measuring electricity, equipment for measuring gases and/or equipment for measuring radio waves). The electronic device according to an embodiment of the present disclosure may be a combination of one or more of the aforementioned various devices. Also, the electronic device according to an embodiment of the present disclosure may be a flexible device. Further, it is obvious to those skilled in the art that the electronic device according to the present disclosure is not limited to the aforementioned devices.

Hereinafter, an electronic device according to various embodiments of the present disclosure will be described with reference to the accompanying drawings. The term "user" used in various embodiments of the present disclosure may refer to a person who uses an electronic device or a device (for example, an artificial intelligence electronic device) that uses an electronic device.

FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a network environment including an electronic apparatus according to an embodiment of the present disclosure.

Referring to FIG. 1, a network 100 including an electronic apparatus 101 is illustrated, where the electronic apparatus 101 may include a bus 110, a first processor 120, a second processor 125, a memory 130, an input/output interface 140, a display 150, and a communication interface 160.

The bus 110 may be a circuit for connecting elements above with each other and transferring communication data (e.g., control messages) between the elements. In addition, the bus 110 may be a common memory that is shared by the first processor 120 and the second processor 125.

The first processor 120 may receive instructions from other elements (e.g., the memory 130, the input/output interface 140, the display unit 150, the communication interface 160, and/or the second processor 125) through, for example, the bus 110, then may decode the received instructions and perform calculation or data processing according to the decoded instructions. The second processor 125 may perform the same operations as that of the first processor 120.

The first processor 120 may be a processor that controls applications for executing applications. The second processor 125 may perform the same operations as that of the first processor 120. In addition, the second processor 125 may control the communication interface 160 of the electronic apparatus 101. The first processor 120 may transition between an active mode and a sleep mode (or a low power mode). In the sleep mode (or the low power mode), power consumption may be relatively less than that of the active mode. When the first processor 120 in the active mode, it may consume more power than when the second processor 125 is in the active mode. The second processor 125 may transition between the active mode and the sleep mode in relation to power consumption of a communication module associated with the second processor 125.

The memory 130 may store instructions and/or data that is received from the first processor 120 and/or other elements (e.g., the input/output interface 140, the display unit 150, the communication interface 160, the second processor 125, and/or the like) and/or may store instructions and/or data that is generated by the first processor 120 and/or other elements. The memory 130 may include programming modules such as, a kernel 131, a middleware 132, an application programming interface (API) 133, and/or applications 134. Each of the programming modules may be configured by software, firmware, hardware, and/or a combination thereof.

The kernel 131 may control and/or manage system resources (e.g., the bus 110, the first processor 120, the second processor 125, the memory 130, and/or the like) that are used in performing operations or functions implemented by other programming modules, for example the middleware 132, the API 133 and/or the applications 134. Furthermore, the kernel 131 may provide an interface by which the middleware 132, the API 133 and/or the applications 134 may access each element of the electronic apparatus 101 for control and/or management.

The middleware 132 may play the intermediate role between the API 133 and/or the applications 134 and the kernel 131 to communicate with each other for transmission and reception of data. Furthermore, in relation to requests for operations received from the applications 134, the middleware 132 may control (e.g., perform scheduling and/or perform load-balancing) the requests, for example, by giving priority for using system resources (e.g., the bus 110, the first processor 120, the second processor 125, the memory 130, and/or the like) of the electronic apparatus 101 to at least one of the applications 134.

The API 133 is an interface by which the applications 134 control functions provided from the kernel 131 or the middleware 132, and it may include, for example, at least one interface or function (e.g., instructions) for file control, window control, image processing, and/or text control.

According to various embodiments of the present disclosure, the applications 134 may include a short message service (SMS)/multimedia messaging service (MMS) application, an e-mail application, a calendar application, an alarm application, a health care application (e.g., an application for measuring an amount of exercise and/or blood sugar), an environmental information application (e.g., an application for providing atmospheric pressure, humidity, and/or temperature), or the like. Additionally or alternatively, the applications 134 may be an application related to the exchange of information between the electronic apparatus 101 and external electronic apparatuses (e.g., electronic apparatuses 102 and 104). The information-exchange-related application may include, for example, a notification relay application for relaying specific information to the external electronic apparatus, or an apparatus management application for managing the external electronic apparatus.

For example, the notification relay application may include a function of transferring notification information generated in other applications (e.g., the SMS/MMS application, the e-mail application, the health care application, and/or the environmental information application) of the electronic apparatus 101 to external electronic apparatuses (e.g., the electronic apparatuses 102 and 104). Additionally or alternatively, the notification relay application may receive notification information from, for example, an external electronic apparatus (e.g., the electronic apparatuses 102 or 104) and provide the same to a user. The apparatus management application may manage (e.g., install, delete, and/or update), for example, at least some functions (e.g., turning an external electronic apparatus (or some elements) on or off, or adjusting the brightness (or resolution) of a display) of an external electronic apparatus (e.g., the electronic apparatuses 102 or 104) that communicates with the electronic apparatus 101, applications executed in the external electronic apparatus, or services (e.g., a phone call service, and/or a messaging service) provided in the external electronic apparatus.

According to various embodiments of the present disclosure, the applications 134 may include applications, which are preset according to the properties (e.g., the type of electronic apparatus) of the external electronic apparatus (e.g., the electronic apparatuses 102 or 104). For example, if the external electronic apparatus is an MP3 player, the applications 134 may include applications related to reproduction of music. Likewise, if the external electronic apparatus is a mobile medical apparatus, the applications 134 may include an application related to a health care. According to an embodiment of the present disclosure, the application 134 may include at least one of applications preset in the electronic apparatus 101 or applications received from external electronic apparatuses (e.g., electronic apparatuses 102 and 104 and/or a server 106).

The input/output interface 140 may transfer instructions or data input by the user through input/output devices (e.g., sensors, keyboards, or touch screens) to the first processor 120, the memory 130, the communication interface 160, and/or the second processor 125 through, for example, the bus 110. For example, the input/output interface 140 may provide data on a user's touch input through a touch screen to the first processor 120. For example, the input/output interface 140 may output instructions or data, which are received from the first processor 120, the memory 130, the communication interface 160, and/or the second processor 125 through the bus 110, through the input/output devices (e.g., speakers or displays). For example, the input/output interface 140 may output audio data processed by the first processor 120 to the user through the speakers.

The display 150 may display various pieces of information (e.g., multimedia data or text data) to the user.

The communication interface 160 may perform communication-connection between the electronic apparatus 101 and external electronic apparatuses (e.g., the electronic apparatuses 102 and 104 and/or server 106). For example, the communication interface 160 may be connected to a network 162 through wireless communication or wired communication to thereby communicate with the external electronic apparatus. The wireless communication may include at least one of Wi-Fi, Bluetooth (BT), near field communication (NFC), a GPS, and/or cellular communication (e.g., long-term evolution (LTE), LTE advanced (LTE-A), code division multiple access (CDMA), wideband CDMA (WCDMA), universal mobile telecommunications systems (UMTS), Wireless Broadband (WiBro), and/or global system for mobile communications (GSM)). The wired communication may include at least one of a universal serial bus (USB), a high definition multimedia interface (HDMI), recommended standard 232 (RS-232), and/or a plain old telephone service (POTS).

According to an embodiment of the present disclosure, the network 162 may be telecommunication networks. The telecommunication networks may include at least one of a computer network, the Internet, the Internet of things, or a telephone network. According to an embodiment of the present disclosure, protocols (a transport layer protocol, a data link layer protocol, or a physical layer protocol) for communication between the electronic apparatus 101 and external electronic apparatuses may be supported by at least one of the applications 134, the API 133, the middleware 132, the kernel 131, and/or the communication interface 160.

The second processor 125 may control the communication interface 160. For example, the second processor 125 may connect or disconnect communications between the electronic apparatus 101 and the external apparatuses (e.g., the electronic apparatuses 102 and 104 and/or the server 106). In addition, the second processor 125 may transmit or receive data to or from the electronic apparatus 101 and the external apparatuses through the communication interface 160. Furthermore, the second processor 125 may transfer or obtain data to or from the first processor 120 using the bus 110.

Figure 2:
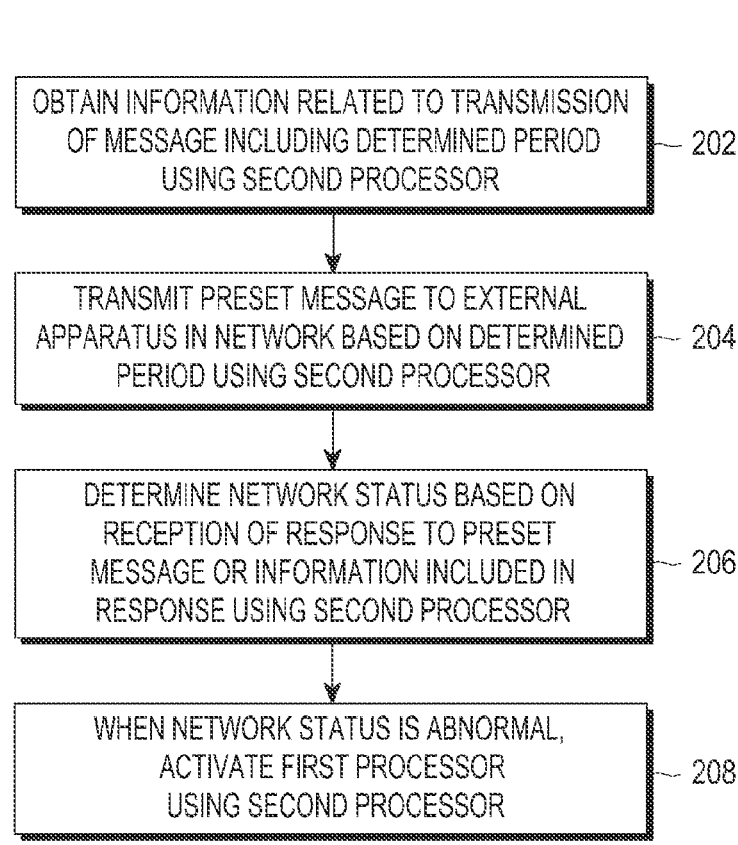
FIG. 2 is a flowchart illustrating a method for operating a plurality of processors in an electronic apparatus according to an embodiment of the present disclosure.

FIG. 2 is a flowchart illustrating a method for operating a plurality of processors in an electronic apparatus according to an embodiment of the present disclosure. The electric apparatus may include a plurality of processors, for example, a first processor (e.g., the first processor 120, as illustrated in FIG. 1) and a second processor (e.g., the second processor 125, as illustrated in FIG. 1).

Referring to FIG. 2, a flowchart 200 is illustrated, such that in operation 202, the electronic apparatus may obtain information related to message transmission, which includes a determined period, using the second processor. The period may be referred to time intervals.

The determined period may mean a period for which the first processor transmits messages to other apparatuses in the network in order to identify the network status. In other words, the determined period may mean time intervals at which the first processor transmits messages to other apparatuses in the network in order to identify the network status. The determined period may be determined based on the communication period/time, for which a communication module controlled by the first processor periodically communicates with other apparatuses (e.g., access points, base stations (BSs), evolved Node B (eNodeB), or the like) that are connected with the network. For example, the communication period/time may be the receiving period/time of beacon signals in a Wi-Fi network (or a Wi-Fi communication module), or the receiving period/time of paging in an LTE network (or an LTE communication module). The communication for the communication period may be performed together with the operation in which the communication module related to the first processor transitions from the sleep mode to the active mode.

The second processor may obtain information related to the communication period and may configure the communication period as a basic unit period. Then, the determined period may be determined based on a combination of the basic unit periods. For example, the determined period may be determined one or more times the communication period, or once, 1.5 times, or 2.5 times the communication period. If the determined period is not determined by the second processor, the first processor may determine the determined period.

The period may be changed to be different from an initial value. The period may be increased when the network is determined to be normal. In addition, the period may be decreased when the network is determined to be abnormal. The period may be increased or decreased lineally or exponentially. In addition, the period may be increased or decreased repeatedly and promptly according to the network status, to be thereby determined. The information related to the message transmission may include at least one of the period information, protocols (or formats) of the messages, address information (e.g., Internet protocol (IP) address, media access control (MAC) address, or the like) of a receiving apparatus of the message, a waiting time for a response to the message, and other information (e.g., authentication information, message size, or the like) necessary for the receiving apparatus.

In operation 204, the electronic apparatus may transmit a preset message according to the determined period to an external apparatus in the network, using the second processor.

The preset message may be generated based on the information collected from the first processor. Alternatively, the preset message may be generated based on information collected from a memory that is functionally connected to the second processor. The second processor may generate a message based on the protocol of at least one message including the collected information. The protocol may include a transmission control protocol (TCP), a datagram congestion control protocol (DCCP), a stream control transmission protocol (SCTP), an IP, an Internet control message protocol (ICMP), an Internet group management protocol (IGMP), an IP security (IPsec), or the like.

The generated message may be transmitted by the second processor according to the determined period of operation 202.

In operation 206, the electronic apparatus may determine the network status, based on whether or not a response to the preset message is received or information included in the response, using the second processor The preset message may be configured so that an apparatus that receives the preset message is to send a response to the electronic apparatus. The configuration may be performed based on the protocol of the preset message. For example, if the preset message is generated by the TCP or the ICMP, the apparatus that receives the message may identify the protocol information included in the preset message to thereby respond to the message.

The response may have the same protocol as that of the preset message. For example, if the apparatus receives the message and identifies that the message is based on the TCP or the ICMP, the apparatus may generate a response message of the same protocol.

The electronic apparatus may receive the response message corresponding to the preset message or receive the response message within a predetermined time. The electronic apparatus may not receive the response message within a predetermined time. The electronic apparatus may receive the response message at a predetermined time. The response message may include information related to the apparatus (e.g., IP address information, MAC address information, or the like) that has responded to the preset message. The response message may include information to show that the network status is abnormal.

For example, the response message may include information to show that the network status is abnormal, based on forward error correction (FEC) information. When the response message is not received or the response message includes information stating that the network status is abnormal, the electric apparatus may determine that the network status is abnormal. When the response message includes the information related to the apparatus that has received the preset message or the information stating that the network status is normal, the electric apparatus may determine that the network status is normal.

In operation 208, when the network status is determined to be abnormal, the first processor may be activated using the second processor. If the network status is determined to be abnormal, the second processor may inform the first processor of the same. The informing operation of the second processor may be executed through predetermined signals between the first processor and the second processor. For example, the signals may be interrupt signals. The first processor that has received the interrupt signal may be either in the sleep mode or in the active mode. The sleep mode may refer to at least one of a state in which the power consumption of the first processor is less than that in the active mode, or a state in which the first processor does not consume any power. The active mode may maintain the power to operate at least one processor. For example, in the active mode of the first processor, the power is maintained to enable the execution of applications or the operation of an operating system (OS).

Figure 3:
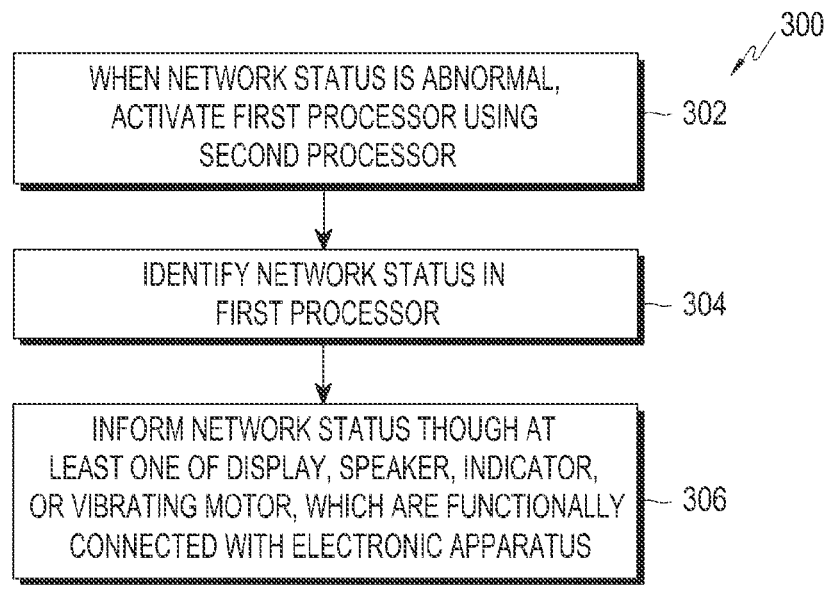
FIG. 3 is a flowchart illustrating a method for displaying a network status in an electronic apparatus according to an embodiment of the present disclosure.

FIG. 3 is a flowchart illustrating a method for displaying a network status in an electric apparatus according to an embodiment of the present disclosure. For example, the electric apparatus may include a first processor (e.g., the first processor 120, as illustrated in FIG. 1) and a second processor (e.g., the second processor 125, as illustrated in FIG. 1).

Referring to FIG. 3, a flowchart 300 is illustrated, wherein, if a network status is determined to be abnormal in operation 302, a first processor (e.g., the first processor 120) may be activated using a second processor (e.g., the second processor 125). For example, the operation 302 may be the same as the operation 208 of FIG. 2.

In operation 304, the second processor may inform the first processor of the network status. The network status may be abnormal as identified in operation 302. The first processor may inform the second processor of the network status by the interrupt signal that was explained in operation 208 of FIG. 2. Additionally, the first processor may inform the second processor of the additional network status as well. For example, the second processor may be informed of the state of not receiving the response message in operation 206 of FIG. 2, packet errors resulting from the abnormal network status even with the reception of the response message, or the signal power of an external apparatus in the network (e.g., signal intensity of base station or wireless connection apparatus).

In operation 306, the first processor may inform the network status through at least one of a display, a speaker, an indicator, and/or a vibration motor, which are functionally connected to the electronic apparatus. In operation 306, the abnormal network status may be displayed on the display. At this time, text (e.g., pop-up message), predetermined pictures (e.g., pictures of indicator), or the like may be displayed on the display. In addition, the user may be informed of the network status by a preset sound or a sound of a preset pattern through the speaker. The vibration motor may be used as well, using at least one of a predetermined strength or a predetermined pattern thereof.

In addition, the electronic apparatus may deactivate a communication module that is functionally connected with the electronic apparatus related to the network. The communication module may be operated by the second processor. The deactivation of the communication module may be conducted by turning the communication module off. In addition, the deactivation of the communication module may include an operation of eliminating programs related to the communication module (e.g., drivers or application programs which are related to the communication module) from a memory. The inactive mode of the communication module may be informed through at least one of the display, the speaker, the indicator and/or the vibration motor.

Figure 4:
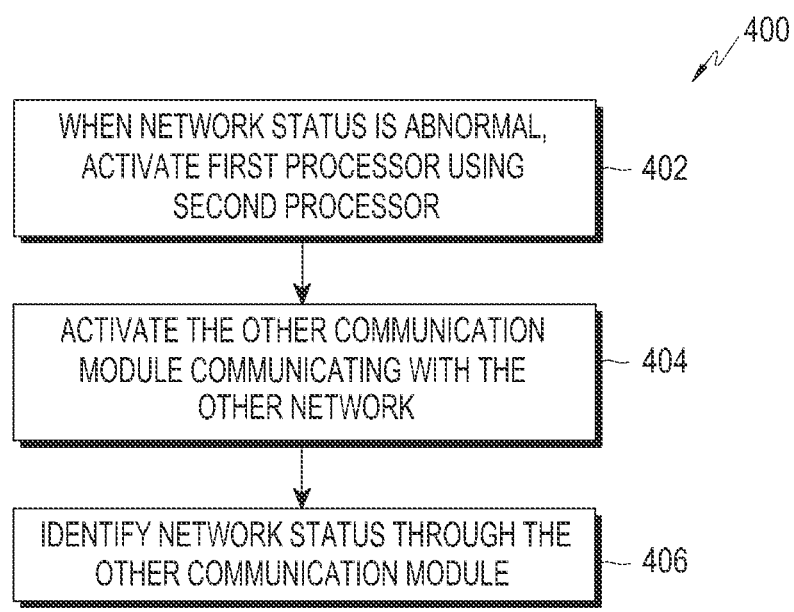
FIG. 4 is a flowchart illustrating a method for activating another communication module in an electronic apparatus according to an embodiment of the present disclosure.

FIG. 4 is a flowchart illustrating a method for activating another communication module in an electronic apparatus according to an embodiment of the present disclosure. The electronic apparatus, for example, may include a first processor (e.g., the first processor 120, as illustrated in FIG. 1) and a second processor (e.g., the second processor 125, as illustrated in FIG. 1).

Referring to FIG. 4, a flowchart 400 is illustrated, such that in operation 402, if the network status is determined to be abnormal, a first processor (e.g., the first processor 120) may be activated using a second processor (e.g., the second processor 125). Operation 402, for example, may be the same as operation 208 in FIG. 2.

In operation 404, if the electronic apparatus includes the other communication module in the inactive mode, which can communicate with another network other than the network, the electronic apparatus may activate the other communication module communicating with the other network. The activation of the other communication module may be conducted by turning on the other communication module. In addition, it may include an operation of loading programs related to the other communication module (e.g., drivers or application programs which are related to the other communication module) into a memory. The operation related to the other communication module may be automatically performed by a setup, or may be performed by the user through notification. The notification may be made through the display or the speaker. The operation may not be performed according to the setup. The setup (information) may be pre-stored in the electronic apparatus (memory), and may vary with user inputs. Other embodiments of the present disclosure may be provided.

In addition, the other communication module may perform a connection with the other network. For example, the other communication module may connect with a cellular network or a Wi-Fi network. The connection with the other network may be a physical connection (e.g., a physical layer (PHY)/MAC connection), a security-related connection (e.g., an authentication operation), an Internet protocol-related connection (e.g., a TCP/IP connection), a separate protocol connection supported by the other network (e.g., BT), an application protocol connection using the other network (e.g., http protocol), or the like.

In operation 406, the electronic apparatus may identify the other network status through the other communication module. The electronic apparatus may identify the other network status through the other communication module using the first processor and the second processor. The operation of identifying the other network status may be the same as the operation of identification through the response in FIG. 2. Operations 404 or 406 may be performed by the first processor and/or the second processor.

When the second processor is capable of controlling two communication modules, operations 404 or 406 may be performed by the second processor. For example, if Wi-Fi communication (or a Wi-Fi module) and BT communication (or a BT module) can be made in a single processor, the single processor may perform operations 404 and 406.

In operation 402, if the network status is determined to be abnormal, the apparatus may additionally perform an operation of searching for the other network using the communication module related to the network (not shown). For example, if the network includes a wireless connection apparatus using Wi-Fi, the electronic apparatus may perform the operation of searching for the other wireless connection apparatus (e.g., searching for Wi-Fi) included in the other network. In addition, the electronic apparatus may connect with the other wireless connection apparatus. The connected electronic apparatus may identify the other network status. At least some of the above-mentioned operations, such as searching for the other network, connecting with the other wireless connection apparatus and/or identifying the other network status, may be performed by the first processor and/or the second processor.

The operations (e.g., operations 202 to 208, operations 302 to 306, and/or operations 402 to 406) described in the procedures or the methods in FIGS. 2 to 4 may be performed in sequence, in parallel, repeatedly, and/or heuristically. In addition, the operations may be performed in a different order. Furthermore, some of the operations may be omitted, or other operations may be added thereto.

Figure 5:
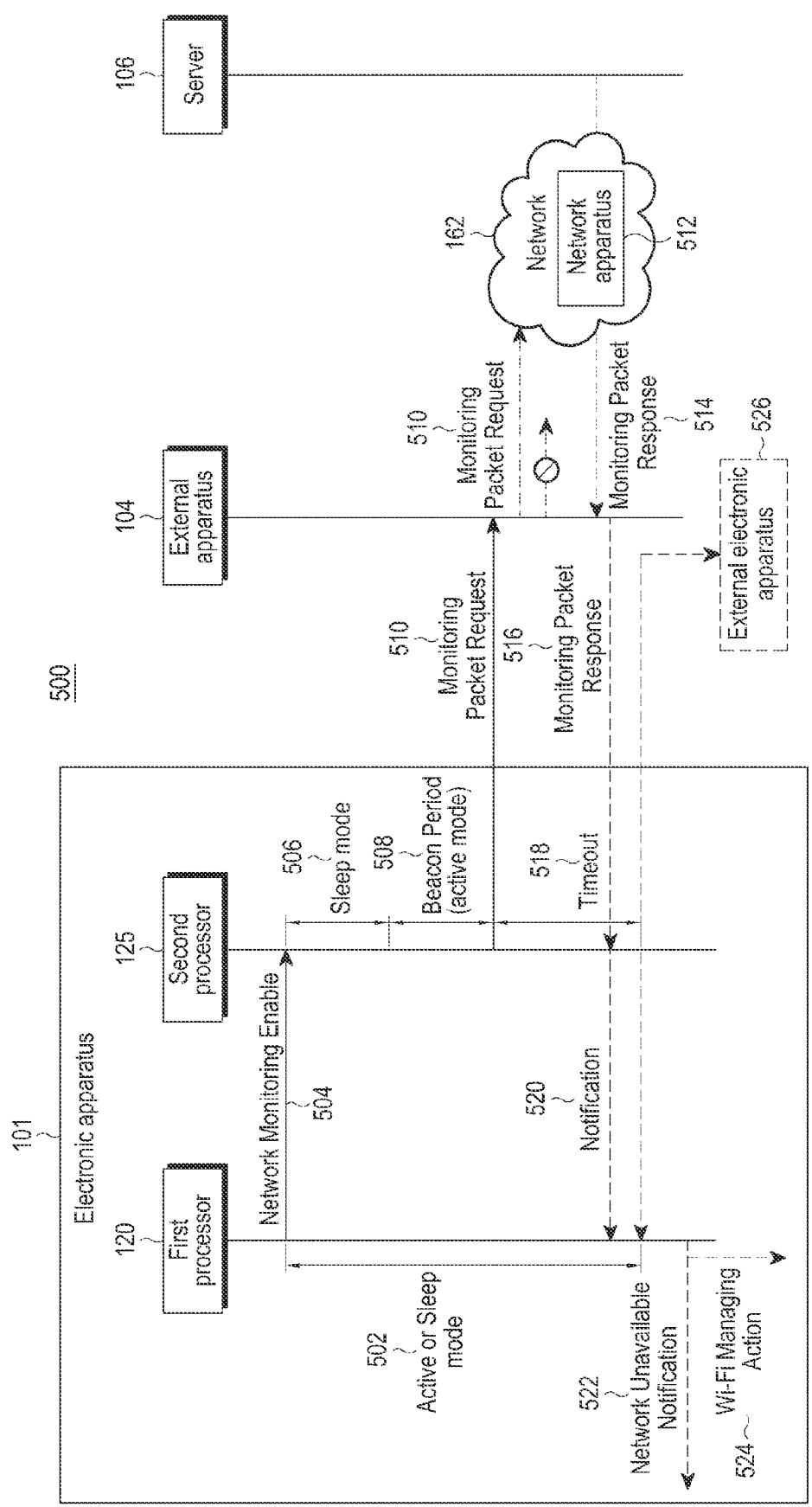
FIG. 5 is a block diagram of a system for determining a network status in an electronic apparatus according to an embodiment of the present disclosure.
Figure 6:
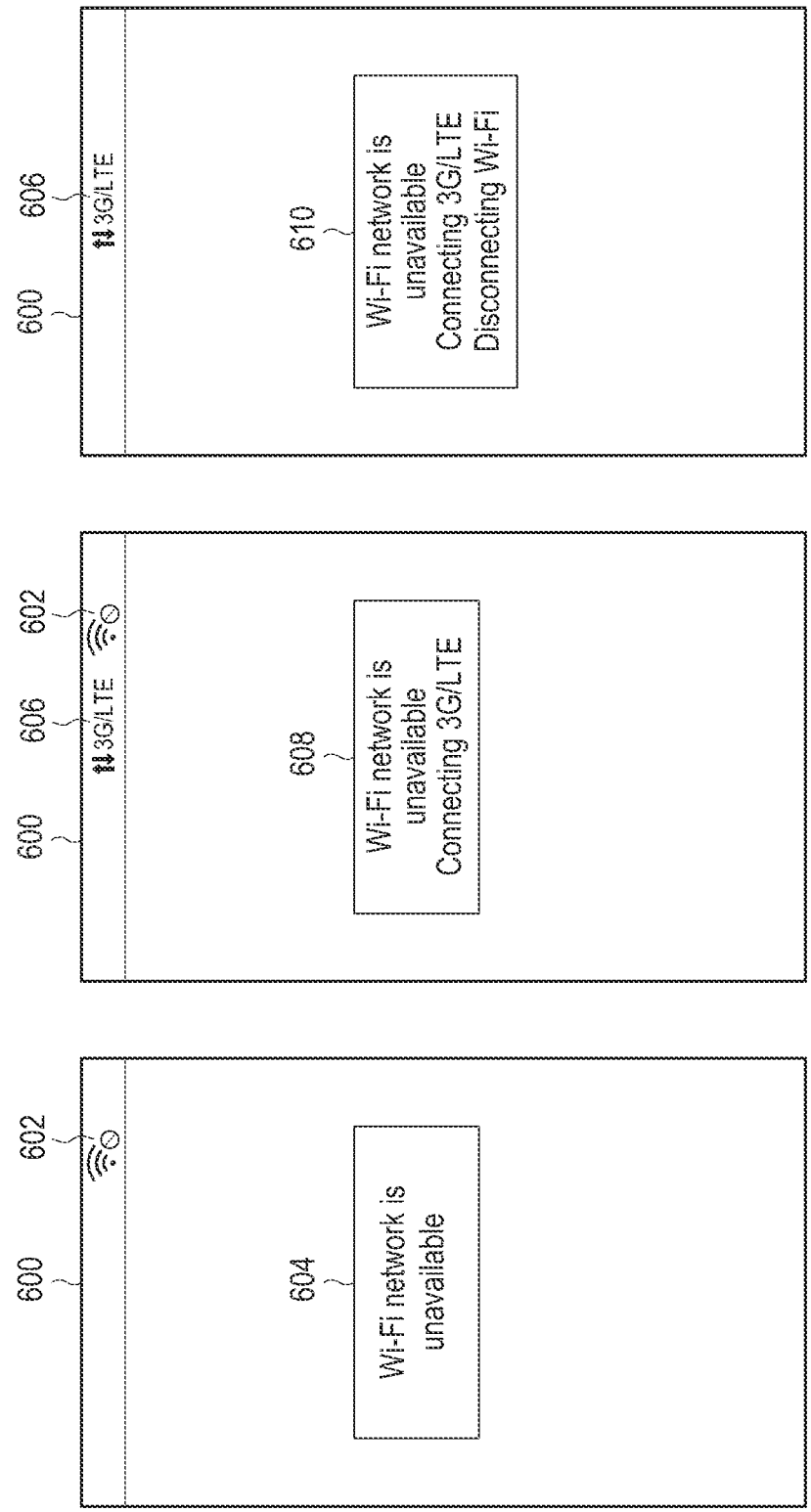
FIGS. 6A, 6B, and 6C illustrate examples of displaying a network status on a display in an electronic apparatus according to various embodiments of the present disclosure.

FIG. 5 is a block diagram of a system for determining a network status in an electronic apparatus according to an embodiment of the present disclosure.

Referring to FIG. 5, a block diagram 500 including an electronic apparatus 101, an external apparatus 104 and a server 106 is illustrated, where the electronic apparatus 101 may, for example, include a first processor 120 and a second processor 125. The first processor 120 may, for example, transfer information related to the preset message for determining the network status to the second processor 125.

The first processor 120 may be an application processor that controls applications. The second processor 125 may control the communication module. In operation 502 the second processor 125 may transition between a sleep mode and an active mode in relation to the power state of the communication module.

The first processor 120 may perform the transition between the sleep mode and the active mode in relation to power consumption.

The first processor 120 may obtain information related to the communication module from the second processor 125. For example, the first processor 120 may obtain information regarding a period for which the communication module communicates with the external apparatus 104, from the second processor 125. The period information may be information regarding the transition of the power mode of the communication module. The transition of the power mode may be information related to the change between a sleep mode 506 and an active mode 508 (or a mode/period for receiving beacon signals) in which the communication module communicates with the external apparatus.

The first processor 120 may determine a transmission period for transmitting the preset message 510 (e.g., a monitoring packet request), a protocol of the preset message, a receiving apparatus of the preset message, a waiting time for a response to the preset message in the second processor 125, or the like, based on the communication information.

The transmission period of the preset message may be changed by the first processor 120 or the second processor 125. The period may be increased or decreased linearly or exponentially. In addition, the period may be changed based on the rule defined by the electronic apparatus 101. For example, if the sensitivity of a signal received by the communication module of the electronic apparatus 101 is low, the transmission period of the preset message may be relatively reduced, and if the sensitivity of a signal received by the communication module of the electronic apparatus 101 is high, the transmission period of the preset message may be relatively increased. The increase or the decrease in the period may be based on the response to the preset message.

For example, if the response is not received, the period may be reduced, and if the response is received, the period may be increased. In addition, when the response message to the preset message is received, the electronic apparatus may identify the information (e.g., FEC information) in the response message, which informs that the network status is not normal, and may change the period. For example, if data integrity is determined to have something wrong as a result of identifying the FEC information in the response message, the period may be reduced. If data integrity is determined to be perfect as a result of identifying the FEC information in the response message, the period may be increased.

The first processor 120 may transfer the information related to the preset message to the second processor 125 at operation 504. For example, the first processor 120 may transfer information on a transmission period for transmitting the preset message, a protocol of the preset message, a receiving apparatus of the preset message, or a waiting time for a response to the preset message in the second processor 125 to the second processor 125. The second processor 125 may generate the preset message based on the protocol related to the preset message, and may transmit the message to the receiving apparatus of the preset message for the determined period. In addition, the electronic apparatus 101 may wait for a response, based on the waiting time (e.g., a timeout period 518) for which the second processor waits for the response to the preset message.

If the first processor 120 is in the sleep mode, the second processor 125 may transfer the preset message. If the first processor 120 is in the sleep mode and the communication module related to the second processor 125 is in the active mode, the second processor 125 may transmit the preset message through the communication module.

The second processor 125 may obtain the period information (e.g., Wi-Fi beacon period, cellular paging period, or the like) by which the communication module related to the second processor communicates with the external apparatus 104, through the communication module. The period information may be obtained based on information (e.g., beacon information, paging information, or the like) that is transmitted by the external apparatus 104, or information that is transmitted when the electronic apparatus 101 and the external apparatus 104 are connected with each other. Based on the obtained period information, the communication module related to the second processor 125 may be activated. The second processor 125 may transmit the preset message according to the period using the communication module.

The second processor 125 may transmit the preset message 510, and may wait for the response message for the timeout period 518. The second processor 125 may receive the response message (e.g., a monitoring packet response) 516. If the response message 516 is not received, or the information (e.g., FEC information) of the response message is identified to show that the network status is not normal, the second processor 125 may inform the first processor 120 of the abnormal state of the network by a notification 520 (or a notification message). The first processor 120 in the sleep mode may transition to the active mode by the notification 520. When the external apparatus connected with the electronic apparatus 101 is disconnected from a network 162 or is not authorized to use the network 162, or the server 106 malfunctions, the response message may not be received.

The response message 516 may be transmitted through the external apparatus 104 that communicates with the electronic apparatus 101. The external apparatus 104 may receive a response message (e.g., a monitoring packet response) 514. The response message 516 may be transmitted based on the response message 514. The response message 516 or the response message 514 may be response messages of the server 106 in response to the preset message 510. The response message 514 may be transmitted to the external apparatus 104 through the network 162. The response message 516 may be received by the electronic apparatus 101. The second processor 125 may identify the response message 516 to thereby determine that the network status is normal, and may not send the notification 520 to the first processor 120. When the network status is normal, the first processor 120 may remain in the sleep mode.

The electronic apparatus 101 may include address information of the receiving apparatus (e.g., the server 106) of the preset message in the preset message 510. The electronic apparatus 101 may configure the preset message 510 so that even though the preset message does not reach the receiving apparatus, a network apparatus 512 in the network responds. The configuration may be based on the protocol of the preset message. For example, the preset message may be an ICMP packet, and a time-to-live (TTL) value of the preset message may be configured. The preset message may be transmitted several times with the TTL value changed. Whenever the preset message passes through an apparatus, the TTL value may decrease by one. An apparatus, by which the TTL value becomes zero, may transmit the response message to the preset message to the electronic apparatus. The network apparatus 512 may be on the routing path from the electronic apparatus to the receiving apparatus (e.g., server 106).

The external apparatus 104 may be an access point in a Wi-Fi network, or a base station or eNodeB in a cellular network. The external apparatus 104 may transmit the response message 516 to the electronic apparatus 101 while communicating with the electronic apparatus 101. If the transmission of the response message fails, the external apparatus 104 may store the response message. The external apparatus 104 may transmit the stored response message to the electronic apparatus 101 when the opportunity comes.

If the response message 516 is not received for a predetermined time (e.g., a timeout period 518) during the operation of waiting for the response message 518, the second processor 125 may inform another external electronic apparatus 526 that the network status of the electronic apparatus 101 is abnormal. For example, the second processor 125 may control a Wi-Fi communication module. The Wi-Fi communication module related to the second processor 125 may be connected to the external apparatus 104. When the second processor 125 determines that the network connected through the external apparatus 104 is abnormal, the second processor 125 may transmit a message informing that the network status is abnormal, through the external electronic apparatus 526. The second processor may simultaneously connect with the external electronic apparatus 526 and the external apparatus 104 in a time division method. Alternatively, the second processor may terminate the connection with the external apparatus 104 first, and then may connect with the external electronic apparatus 526. If the communication module related to the second processor 125 is not based on a Wi-Fi network, the second processor 125 may simultaneously connect with the external apparatus 104 and the external electronic apparatus 526 using a frequency division method or a code division method. In addition, the second processor 125 may communicate with the external electronic apparatus 526 through the other communication module that is functionally connected with the electronic apparatus 101, and may inform the same of the abnormal status of the network through the external apparatus 104. For example, the communication module may be based on a Wi-Fi network, and the other communication module may be based on a BT network. If the network is determined to be abnormal, the electronic apparatus 101 may make a communication-connection with the external electronic apparatus 526. If the electronic apparatus 101 has been connected with the external electronic apparatus 526 prior to the determination, the operation of the connection may be omitted.

When the notification 520 is received, the first processor 120 may send a notification (e.g., a network unavailable notification) 522 to a module that is functionally connected with the electronic apparatus in order to inform that the network status is not normal. The notification 522 may be shown using a hardware module. For example, the first processor may inform of the abnormal status of the network through at least one of a display, a speaker, an indicator (e.g., a Light Emitting Diode (LED)), or a vibrating motor. In addition, the first processor may provide the notification 522 by software. For example, the abnormal status of the network may be displayed on the display that is functionally connected with the electronic apparatus in the form of text or an image for the user.

When the notification 520 is received, the first processor 120 may perform a Wi-Fi managing action at operation 524 by which a Wi-Fi network (or a Wi-Fi communication module) is activated or deactivated.

FIGS. 6A, 6B, and 6C illustrate examples of displaying a network status on a display in an electronic apparatus according to various embodiments of the present disclosure. The electronic apparatus may, for example, include a first processor (e.g., the first processor 120, as illustrated in FIG. 1) and a second processor (e.g., the second processor 125, as illustrated in FIG. 1).

Referring to FIGS. 6A to 6C, a display 600 is illustrated, where an electronic apparatus (e.g., electronic apparatus 101) may display information of a network status on the display 600 (e.g., the display 150, as illustrated in FIG. 1) that is functionally connected with the electronic apparatus.

Referring to FIG. 6A, a first processor may display the network status on the display 600, for example, by an image 602 indicating that the network status is not normal. For example, the network status may be displayed in a notification bar. In addition, the first processor may display text 604 showing the network status on the display 600. For example, the text 604 may be displayed on the display 600 in the form of a pop-up window. The first processor may display the abnormal status of the network, and may operate nothing.

When the network status is identified to be abnormal, the first processor may try to make a connection with another network, which may be displayed.

Referring to FIG. 6B, the first processor may display the image 602 showing the abnormal status of the network, and at the same time, may display another image 606 that shows that the first processor is trying to connect with another network. In addition, the first processor may display text 608 that shows that the first processor is trying to connect with another network. For example, when the connection to a Wi-Fi network is not normal, the first processor may try to connect with a 3rd-generation (3G)/LTE network, and such a state may be displayed by an icon (e.g., the image 606) on the notification bar together with a pop-up window of text.

When the network status is identified to be abnormal, the first processor may try to make a connection with another network, and may deactivate the network. The first processor may inform that the network status is not normal and the first processor is trying to connect with another network. At the same time, the first processor may inform that the network is deactivated.

Referring to FIG. 6C, the network status and the status of another network may be informed by the image 606 and the text 610. For example, if the Wi-Fi network is not normal, the Wi-Fi network may be deactivated and then the image 602 of the Wi-Fi network may disappear from the notification bar. Then, when the electronic apparatus is connected to a 3G/LTE network, an image 606 thereof may be displayed on the notification bar. In addition, text 610 informing that the Wi-Fi network is not normal to be thereby deactivated and the electronic apparatus is connecting with the 3G/LTE network, may be displayed in a pop-up window.

According to various embodiments of the present disclosure, a method for determining a network status may include: obtaining a period determined by a first processor of an electronic apparatus, using a second processor of the electronic apparatus; transmitting a preset message from the electronic apparatus to another apparatus in a network according to the determined period, using the second processor; determining the network status based on at least one of (i) whether or not a response to the preset message is received and (ii) information included in the response, using the second processor; and when the network status is determined to be abnormal, activating the first processor using the second processor.

According to various embodiments of the present disclosure, the first processor may be an application processor that executes applications of the electronic apparatus, and the second processor may be a processor related to a communication module of the electronic apparatus.

According to various embodiments of the present disclosure, the first processor may consume more power than that of the second processor when the first processor is activated.

According to various embodiments of the present disclosure, the operation of obtaining the determined period may include an operation of determining the determined period based on a communication period between the electronic apparatus and the other apparatus to connect the electronic apparatus to the network.

According to various embodiments of the present disclosure, the operation of determining the determined period may further include an operation of activating a communication module related to the second processor from a sleep mode during the communication period to communicate with the other apparatus.

According to various embodiments of the present disclosure, the operation of obtaining the determined period may include an operation of at least one of increasing and decreasing the determined period in at least one of a linear manner and an exponential manner using the second processor.

According to various embodiments of the present disclosure, the operation of obtaining the determined period may include adjusting the determined period based on information related to a response to a message that has previously been transmitted using the second processor.

According to various embodiments of the present disclosure, the operation of obtaining the determined period may include obtaining network information including at least one of an address, a protocol, and a waiting time, which are related to the network, from the first processor.

According to various embodiments of the present disclosure, the operation of transmitting the preset message may include generating the preset message based on network information including at least one of an address, a protocol, and a waiting time, which are related to the network.

According to various embodiments of the present disclosure, the operation of transmitting the preset message may include transmitting the preset message when the first processor is in a sleep mode.

According to various embodiments of the present disclosure, the operation of transmitting the preset message may include activating a communication module related to the second processor based on a setup for an initial connection between the electronic apparatus and the other apparatus, and transmitting the preset message.

According to various embodiments of the present disclosure, the operation of determining the network status may include, if the response is not received within a predetermined time, determining that the network status is abnormal.

According to various embodiments of the present disclosure, the operation of determining the network status may include, if the response is not received or information included in the response is different from information included in a normal response, determining that the network status is abnormal.

According to various embodiments of the present disclosure, the method may further include the operation of, if the network status is determined to be normal, refraining from activating the first processor.

Figure 7:
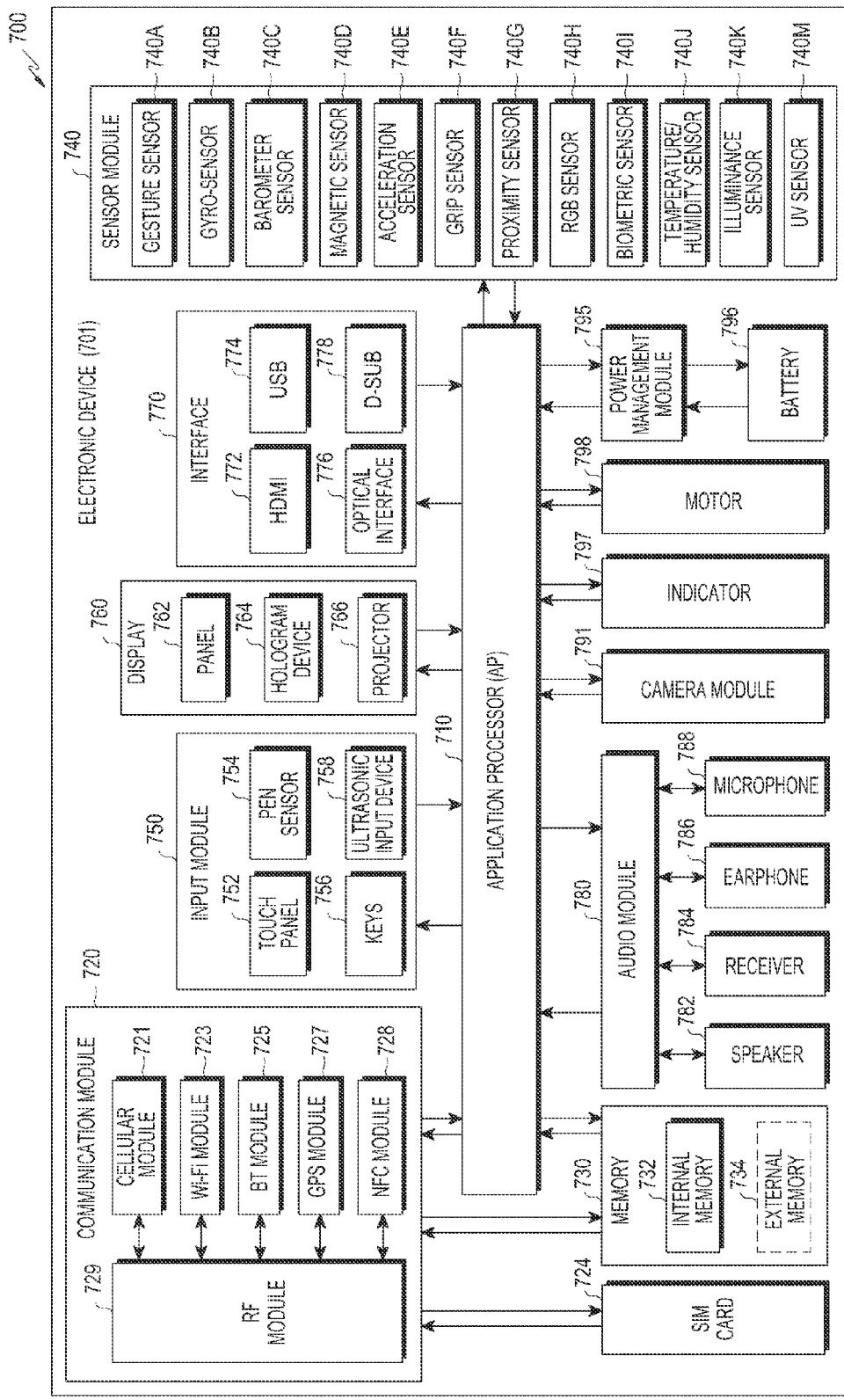
FIG. 7 is a block diagram of an electronic apparatus according to an embodiment of the present disclosure.

FIG. 7 is a block diagram of an electronic apparatus according to an embodiment of the present disclosure.

Referring to FIG. 7, a block diagram 700 including an electronic apparatus 701 is illustrated, where the electronic apparatus 701 may, for example, include a part of or all of elements of the electronic apparatus 101, as illustrated in FIG. 1. The electronic apparatus 701 may include one or more application processors (APs) 710, a communication module 720, a subscriber identification module (SIM) card 724, a memory 730, a sensor module 740, an input module 750, a display 760, an interface 770, an audio module 780, a camera module 791, a power management module 795, a battery 796, an indicator 797, and a motor 798.

The AP 710 may control a multitude of hardware or software elements connected with the AP 710 and perform processing of various data including multimedia data and calculation, by running an OS or application programs. The AP 710 may be implemented by, for example, a system on chip (SoC). According to an embodiment, the AP 710 may further include a graphic processing unit (GPU) and/or an image signal processor (ISP). The AP 710 may include at least some (e.g., a cellular module 721) of the elements shown in FIG. 7. The AP 710 may load instructions or data received from at least one of other elements (e.g., a non-volatile memory) into a volatile memory to thereby process the same, and may store various pieces of data in the non-volatile memory.

The communication module 720 may have an identical or a similar configuration to the communication interface 160, as illustrated in FIG. 1. For example, the communication module 720 may include the cellular module 721, a Wi-Fi module 723, a BT module 725, a GPS module 727, an NFC module 728 and a radio frequency (RF) module 729.

The cellular module 721 may provide services of voice calls, video calls and text messaging, or an Internet service through communication networks. For example, the cellular module 721 may perform identification and authentication of the electronic apparatus 701 in communication networks, using SIMs (e.g., the SIM card 724). According to an embodiment of the present disclosure, the cellular module 721 may perform at least some of the functions provided by the AP 710. According to an embodiment of the present disclosure, the cellular module 721 may include a communication processor (CP).

For example, each of the Wi-Fi module 723, the BT module 725, the GPS module 727 and the NFC module 728 may include a processor for processing data transmitted and received through the corresponding module. According to another embodiment of the present disclosure, at least some (e.g., two or more) of the cellular module 721, the Wi-Fi module 723, the BT module 725, the GPS module 727, and the NFC module 728 may be included in one integrated chip (IC) or one IC package.

The RF module 729 may transmit and receive data, for example, RF signals. The RF module 729 may include, for example, a transceiver, a power amp module (PAM), a frequency filter, a low noise amplifier (LNA), or the like. According to an embodiment of the present disclosure, at least one of the cellular module 721, the Wi-Fi module 723, the BT module 725, the GPS module 727 and the NFC module 728 may transmit and receive RF signals through separated modules.

The SIM card 724 may, for example, include a card adopting a SIM and/or an embedded SIM, and may include inherent identification information (e.g., an integrated circuit card identifier (ICCID)) or subscriber information (e.g., an international mobile subscriber identity (IMSI)).

The memory 730 may include an internal memory 732 and/or an external memory 734. The internal memory 732 may include at least one of volatile memories (e.g., a dynamic random access memory (DRAM), a static RAM (SRAM), a synchronous DRAM (SDRAM), or the like) or non-volatile memories (e.g., a one time programmable read only memory (OTPROM), a PROM, an erasable and programmable ROM (EPROM), an electrically erasable and programmable ROM (EEPROM), a mask ROM, a flash ROM, a flash memory (e.g., a not and (NAND) flash memory, a not or (NOR) flash memory, or the like), a hard drive, a solid state drive, or the like).

The external memory 734 may further include a flash drive, for example, a compact flash (CF), a secure digital (SD), a micro-SD, a mini-SD), an extreme digital (xD), a memory stick, or the like. The external memory 734 may be functionally and/or physically connected with the electronic apparatus 701 through various interfaces.

The sensor module 740 may measure physical quantities and may detect an operation state of the electronic apparatus 701, to thereby convert the measured or detected information into electric signals. The sensor module 740 may include at least one of, for example, a gesture sensor 740A, a gyro-sensor 740B, an atmospheric sensor (e.g., a barometer sensor) 740C, a magnetic sensor 740D, an acceleration sensor 740E, a grip sensor 740F, a proximity sensor 740G, a color sensor 740H (e.g., a red-green-blue (RGB) sensor), a biometric sensor 740I, a temperature/humidity sensor 740J, an illuminance sensor 740K, or an ultra violet (UV) sensor 740M.

Alternatively or additionally, the sensor module 740 may further include an E-nose sensor, an electromyography sensor (EMG), an electroencephalogram sensor (EEG), an electrocardiogram sensor (ECG), an infrared (IR) sensor, an iris sensor, or a fingerprint sensor, or the like. The sensor module 740 may further include a control circuit for controlling at least one sensor included therein. In various embodiments of the present disclosure, the electronic apparatus 701 may include a processor for controlling the sensor module 740 as a part of the AP 710 or separately from the same, and the processor may control the sensor module 740 while the AP 710 is in the sleep mode.

The input module 750 may include a touch panel 752, a (digital) pen sensor 754, keys 756, and/or an ultrasonic input device 758. The touch panel 752 may adopt at least one of, for example, a capacitive type, a pressure type, an IR type, or an ultrasonic type. In addition, the touch panel 752 may further include a control circuit. The touch panel 752 may further include a tactile layer, and may provide a user with a tactile reaction.

For example, the (digital) pen sensor 754 may be a part of the touch panel, or may include a separate recognition sheet. The keys 756 may include, for example, physical buttons, optical keys, or a keypad. The ultrasonic input device 758 may detect acoustic waves with a microphone (e.g., a microphone 788) in the electronic apparatus 701 through an input means that generates ultrasonic signals to thereby identify data.

The display 760 (e.g., display 150) may include a panel 762, a hologram device 764, and/or a projector 766. The panel 762 may, for example, include identical or similar elements to those of the display 150 in FIG. 1. The panel 762 may be implemented to be, for example, flexible, transparent or wearable. The panel 762 may be configured with the touch panel 752 as a single module. The hologram device 764 may display three dimensional (3D) images in the air by using interference of light. The projector 766 may display images by projecting light onto a screen. The screen may be positioned, for example, inside or outside the electronic apparatus 701. According to an embodiment, the display 760 may further include a control circuit for controlling the panel 762, the hologram device 764, and/or the projector 766.

The interface 770 may include, for example, an HDMI 772, a USB 774, an optical interface 776, and/or a D-subminiature (D-sub) 778. The interface 770 may be included in, for example, the communication interface 160, as shown in FIG. 1. Additionally or alternatively, the interface 770 may include, for example, a mobile high-definition link (MHL) interface, an SD card/multi-media card (MMC) interface and/or an infrared data association (IrDA) standard interface.

The audio module 780 may convert a sound into an electric signal, and vice versa. At least some elements of the audio module 780 may be included, for example, in the input/output interface 140 shown in FIG. 1. For example, the audio module 780 may process voice information input or output through a speaker 782, a receiver 784, an earphone 786 and/or the microphone 788.

The camera module 791 is an apparatus for photographing still and moving images, and it may include at least one image sensor (e.g., a front sensor and/or a rear sensor), lenses, an ISP, and/or a flash (e.g., LED and/or a xenon lamp).

The power control module 795 may manage power of the electronic apparatus 701. Although not shown, the power management module 795 may include, for example, a power management IC (PMIC), a charger IC, a battery and/or a fuel gauge. The PMIC may have a wired charging type and a wireless charging type. The wireless charging type may encompass, for example, a magnetic resonance type, a magnetic induction type or an electromagnetic wave type, and additional circuits for wireless charging, for example, coil loops, resonance circuits, rectifiers, or the like, may be provided. The battery gauge may measure, for example, the remaining power of the battery 796, a charging voltage and current, or temperature. The battery 796 may include, for example, a rechargeable battery or a solar battery.

The indicator 797 may display a specific state, for example, a booting state, a message state or a charging state of the whole or a part (e.g., the AP 710) of the electronic apparatus 701. The motor 798 may convert electric signals into a mechanical vibration, and provide a vibration or a haptic effect. Although not shown, the electronic apparatus 701 may include a processing apparatus (e.g., the GPU) for supporting mobile TV. The processing apparatus for supporting mobile TV may process media data according to the standard such as, for example, digital multimedia broadcasting (DMB), digital video broadcasting (DVB) or media flow.

Each of the components of the electronic device according to the present disclosure may be implemented by one or more components and the name of the corresponding component may vary depending on a type of the electronic device. The electronic device 701 may include at least one of the above-described component elements, and some component elements may be omitted or an additional component element may be added. Further, some of the components of the electronic device according to the various embodiments of the present disclosure may be combined to form a single entity, and thus, may equivalently execute functions of the corresponding elements prior to the combination.

According to various embodiments of the present disclosure, an electronic apparatus for determining a network status may include: a first processor configured to determine a period for communications between the electronic apparatus and another apparatus in a network; and a second processor configured to: obtain the determined period; transmit a preset message to the other apparatus according to the determined period; determine the network status based on at least one of (i) whether or not a response to the preset message is received and (ii) information included in the response; and when the network status is determined to be abnormal, activate the first processor.

According to various embodiments of the present disclosure, the apparatus may further include at least one of a first communication module configured to connect the electronic apparatus to the network, and a second communication module configured to connect the electronic apparatus to another network, using the second processor.

According to various embodiments of the present disclosure, the second processor, when the network status is determined to be abnormal, may be further configured to connect the second communication module to the other network in order to inform the other apparatus that the network status is determined to be normal.

According to various embodiments of the present disclosure, the apparatus may further include a display that is functionally connected with the electronic apparatus, wherein at least one of the first processor and the second processor is further configured to display at least one of the network status and information related to the other network through the display.

According to various embodiments of the present disclosure, the second processor may be further configured to transmit the preset message to one of a plurality of apparatuses in the network through the other apparatus, based on address information transmitted from the first processor.

According to various embodiments of the present disclosure, the response may be received from at least one of the other apparatus or an external apparatus on the routing path of the preset message.

According to various embodiments of the present disclosure, the other apparatus, when a transmission of the response fails, may be further configured to store data related to the preset message.

According to various embodiments of the present disclosure, at least one of the first processor and the second processor, when the network status is determined to be abnormal, may be further configured to inform the network status through at least one of a display, a speaker, an indicator, and a motor, which are functionally connected with the electronic apparatus.

Figure 8:
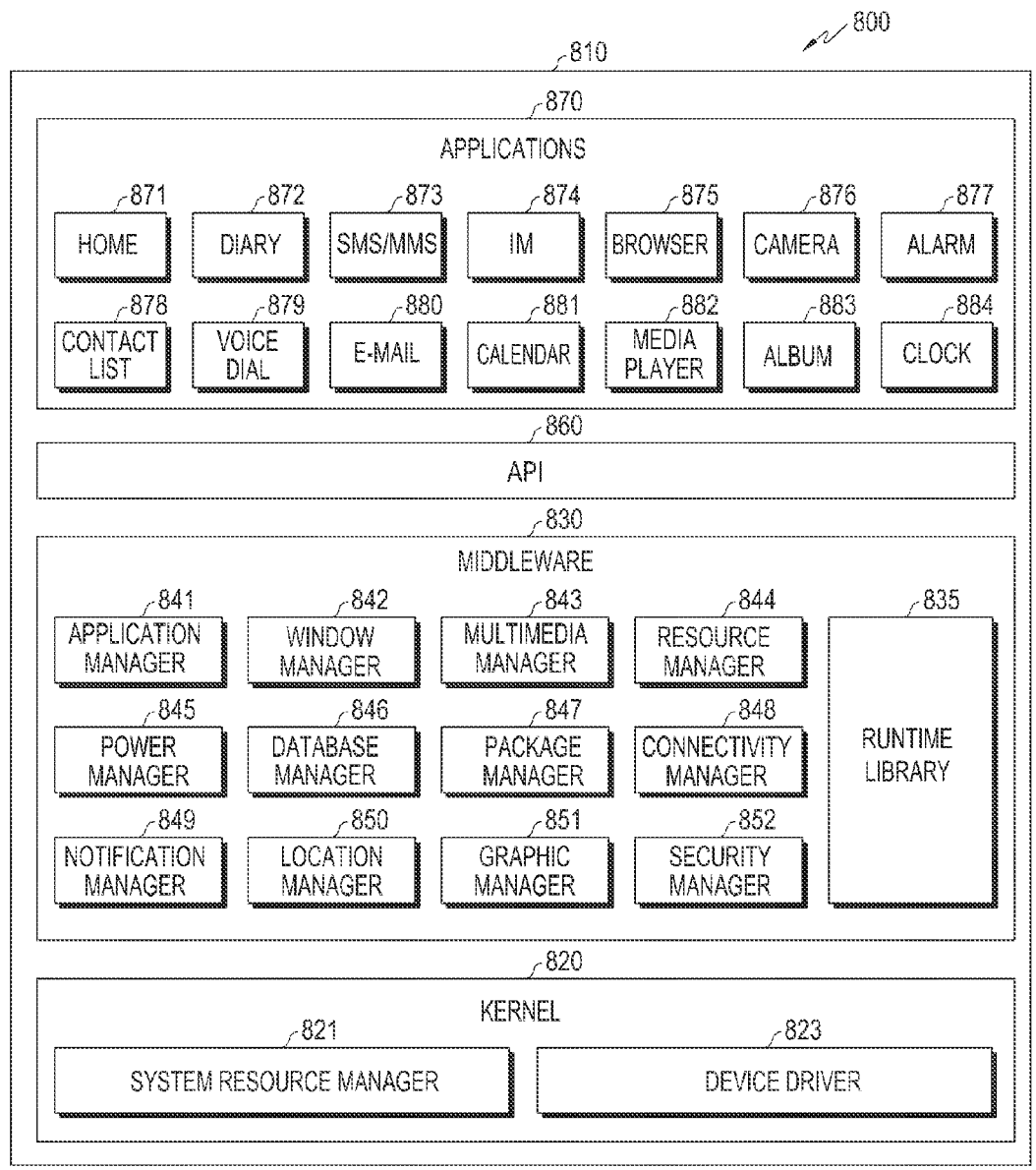
FIG. 8 is a block diagram of a program module of an electronic apparatus according to an embodiment of the present disclosure.

FIG. 8 is a block diagram of a program module according to an embodiment of the present disclosure.

Referring to FIG. 8, a block diagram including a program module 810 is illustrated, where the program module 810 may include an OS that controls resources related to an electronic apparatus (e.g., the electronic apparatus 101, as illustrated in FIG. 1), or various applications (e.g., the applications 134, as illustrated in FIG. 1) which are executed under the OS. The OS may be, for example, Android, iOS, Windows, Symbian, Tizen, Bada, or the like.

The program module 810 may include a kernel 820, a middleware 830, an API 860 and/or applications 870. At least some of the program module 810 may be preload in the electronic apparatus, or may be downloaded from the server (e.g., the server 106, as illustrated in FIG. 1).

The kernel 820 (e.g., the kernel 131, as illustrated in FIG. 1) may include a system resource manger 821 and/or a device driver 823. The system resource manger 821 may perform a control, allocation and/or collection of system resources. According to an embodiment of the present disclosure, the system resource manager 821 may include a process managing unit, a memory managing unit, and/or a file system managing unit. For example, the device driver 823 may include a display driver, a camera driver, a BT driver, a shared memory driver, a USB driver, a keypad driver, a Wi-Fi driver, an audio driver, and/or inter-process communication (IPC) driver.

The middleware 830 may provide common functions necessary for the applications 870 or may provide various functions to the applications 870 through the API 860 in order to effectively use limited system resources inside the electronic apparatus for the applications 870. According to an embodiment of the present disclosure, the middleware 830 (e.g., the middleware 132, as illustrated in FIG. 1) may include at least one of a run-time library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, a security manager 852, or the like.

The run-time library 835 may include a library module that a compiler uses to add new functions through a programming language during execution of applications. The rum-time library 835 may perform functions of input/output, managing memories, and/or calculating formulas.

The application manager 841 may manage a life period of at least one of the applications 870. The window manager 842 may manage a GUI resource used in a screen. The multimedia manager 843 may recognize a format necessary for the reproduction of various media files, and perform encoding or decoding of the media files using a codec corresponding to the format. The resource manager 844 may manage resources such as a source code of at least one of the applications 870, memories or storages.

The power manager 845 may manage a battery or a power source in cooperation with a basic input/output system (BIOS), and provide power information required for the operation of the electronic apparatus. The database manager 846 may manage generating, searching or changing of a database used in at least one of the applications 870. The package manager 847 may manage an installation or an update of the application distributed in the form of a package file.

The connectivity manager 848 may manage a wireless connection such as, for example, Wi-Fi or BT. The notification manager 849 may display or notify events such as received messages, appointments, proximity notifications in a manner that does not disturb a user. The location manager 850 may manage location information of an electronic apparatus. The graphic manager 851 may manage a graphic effect to be provided to a user and interfaces related thereto. The security manager 852 may provide general security functions required for system security or a user authentication. According to an embodiment of the present disclosure, when an electronic apparatus (e.g., the electronic apparatus 101) adopts a phone call function, the middleware 830 may further include a telephone manager to manage a voice or video phone call function of the electronic apparatus.

The middleware 830 may include a middleware module constituting a combination of various functions of the elements mentioned above. The middleware 830 may provide modules specialized for the type of OS in order to provide specialized functions. In addition, the middleware 830 may dynamically remove some of the typical elements or add new elements.

The API 860 (e.g., the API 133, as illustrated in FIG. 1), that is a group of API programming functions, may be provided with a different configuration according to OSs. For example, for Android and/or iOS, a single API set may be provided to each of flatforms. For Tizen, for example, two or more API sets may be provided.

The applications 870 (e.g., the applications 134, as illustrated in FIG. 1) may include one or more applications that provide functions of, for example, a home 871, a diary 872, an SMS/MMS 873, an instant message (IM) 874, a browser 875, a camera 876, an alarm 877, a contact list 878, a voice dial 879, e-mail 880, a calendar 881, a media player 882, an album 883, and a clock 884, as well as, but not illustrated, health care (e.g., measuring the amount of exercise or blood sugar), provision of environmental information (e.g., atmospheric pressure, humidity, or temperature), or the like.

According to an embodiment of the present disclosure, the applications 870 may include an application (hereinafter, referred to as an "information-exchange application) that is related to the exchange of information between the electronic apparatus (e.g., the electronic apparatus 101, as illustrated in FIG. 1) and external electronic apparatuses (e.g., the electronic apparatus 102 or 104, as illustrated in FIG. 1). The information-exchange application may include, for example, a notification relay application for relaying specific information to the external electronic apparatus, or an apparatus management application for managing the external electronic apparatus.

For example, the notification relay application may include a function of transferring notification information generated in other applications (e.g., an SMS/MMS application, an e-mail application, a health care application, and/or an environmental information application) of the electronic apparatus to an external electronic apparatus (e.g., the electronic apparatuses 102 and 104). Additionally or alternatively, the notification relay application may receive notification information from the external electronic apparatus and may provide the same to the user. The apparatus management application may manage (e.g., install, delete, or update), for example, at least some functions (e.g., turning the external electronic apparatus (or some elements thereof) on or off, or adjusting the brightness (or resolution) of a display) of the external electronic apparatus (e.g., the electronic apparatus 104) that communicates with the electronic apparatus 101, applications performed in the external electronic apparatus, or services (e.g., phone call service, or messaging service) provided in the external electronic apparatus.

According to various embodiments of the present disclosure, the applications 870 may include applications (e.g., the healthcare application), which are determined according to the properties (e.g., the type of electronic apparatus is a mobile medical apparatus) of the external electronic apparatus (e.g., the electronic apparatuses 102 and 104). According to an embodiment of the present disclosure, the applications 870 may include applications received from external electronic apparatuses (e.g., the server 106 or the electronic apparatuses 102 and 104). According to various embodiments of the present disclosure, the applications 870 may include preloaded applications or third party applications that can be downloaded from the server. Names of the elements of the program module 810 according to the illustrated embodiment may vary with the type of OS.

According to various embodiments of the present disclosure, at least a part of the programming module 810 may be implemented in software, firmware, hardware, or a combination of two or more thereof. At least a part of the programming module 810 may, for example, be implemented (e.g., executed) by a processor (e.g., the AP 710, as illustrated in FIG. 7). At least a part of the programming module may include, for example, a module, a program, a routine, a set of instructions and/or a process for performing one or more functions.

The term "module" used in the present disclosure may refer to, for example, a unit including one or more combinations of hardware, software, and firmware. The "module" may be interchangeably used with, for example, the terms "unit," "logic," "logical block," "component," and/or "circuit." The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific IC (ASIC) chip, a Field-Programmable Gate Arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 120, as illustrated in FIG. 1), may cause the one or more processors to execute the function corresponding to the instruction. The computer-readable storage medium may be, for example, the memory 130, as illustrated in FIG. 1.

The computer readable recoding medium may include a hard disk, a floppy disk, magnetic media (e.g., a magnetic tape), optical media (e.g., a Compact Disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of determining a network status, the method comprising:
obtaining a period determined by a first processor of an electronic apparatus, using a second processor of the electronic apparatus;
transmitting a preset message from the electronic apparatus to another apparatus in a network according to the determined period, using the second processor;
determining the network status based on at least one of (i) whether or not a response to the preset message is received and (ii) information included in the response, using the second processor; and
when the network status is determined to be abnormal, activating the first processor using the second processor.

2. The method of claim 1,
wherein the first processor is an application processor that executes applications of the electronic apparatus, and
wherein the second processor is a processor related to a communication module of the electronic apparatus.

3. The method of claim 1, wherein the first processor consumes more power than the second processor when the first processor is activated.

4. The method of claim 1, wherein the obtaining of the determined period comprises determining the determined period based on a communication period between the electronic apparatus and the other apparatus to connect the electronic apparatus to the network.

5. The method of claim 4, wherein the determining of the determined period further comprises activating a communication module related to the second processor from a sleep mode during the communication period to communicate with the other apparatus.

6. The method of claim 1, wherein the obtaining of the determined period comprises at least one of increasing and decreasing the determined period in at least one of a linear manner and an exponential manner using the second processor.

7. The method of claim 1, wherein the obtaining of the determined period comprises adjusting the determined period based on information related to a response to a message that has previously been transmitted using the second processor.

8. The method of claim 1, wherein the obtaining of the determined period comprises obtaining network information including at least one of an address, a protocol, and a waiting time, which are related to the network, from the first processor.

9. The method of claim 1, wherein the transmitting of the preset message comprises generating the preset message based on network information including at least one of an address, a protocol, and a waiting time, which are related to the network.

10. The method of claim 1, wherein the transmitting of the preset message comprises transmitting the preset message when the first processor is in a sleep mode.

11. The method of claim 1, wherein the transmitting of the preset message comprises:
activating a communication module related to the second processor based on a setup for an initial connection between the electronic apparatus and the other apparatus; and
transmitting the preset message.

12. The method of claim 1, wherein the determining of the network status comprises, if the response is not received within a predetermined time, determining that the network status is abnormal.

13. The method of claim 1, wherein the determining of the network status comprises, if the response is not received or information included in the response is different from information included in a normal response, determining that the network status is abnormal.

14. The method of claim 1, further comprising:
determining that the network status is abnormal based on forward error correction information included in the response; and
displaying information to a user indicating that the network status is abnormal, when the network status is determined to be abnormal.

15. The method of claim 1, further comprising, if the network status is determined to be normal, refraining from activating the first processor.

16. An electronic apparatus for determining a network status, the electronic apparatus comprising:
a first processor configured to determine a period for communications between the electronic apparatus and another apparatus in a network; and
a second processor configured to:
obtain the determined period;
transmit a preset message to the other apparatus according to the determined period;
determine the network status based on at least one of (i) whether or not a response to the preset message is received and (ii) information included in the response; and
when the network status is determined to be abnormal, activate the first processor.

17. The electronic apparatus of claim 16, further comprising at least one of a first communication module configured to connect the electronic apparatus to the network, and a second communication module configured to connect the electronic apparatus to another network, using the second processor.

18. The electronic apparatus of claim 17, wherein the second processor, when the network status is determined to be abnormal, is further configured to connect the second communication module to the other network in order to inform the other electronic apparatus that the network status is determined to be abnormal.

19. The electronic apparatus of claim 17, further comprising a display that is functionally connected with the electronic apparatus,
wherein at least one of the first processor and the second processor is further configured to display at least one of the network status and information related to the other network through the display.

20. The electronic apparatus of claim 16, wherein the second processor is further configured to transmit the preset message to one of a plurality of apparatuses in the network through the other apparatus, based on address information transmitted from the first processor.

21. The electronic apparatus of claim 16, wherein the response is received from at least one of the other apparatus and an external apparatus on a routing path of the preset message.

22. The electronic apparatus of claim 16, wherein the other apparatus, when a transmission of the response fails, is configured to store data related to the preset message.

23. The electronic apparatus of claim 16, wherein at least one of the first processor and the second processor, when the network status is determined to be abnormal, is further configured to inform the network status through at least one of a display, a speaker, an indicator, and a motor, which are functionally connected with the electronic apparatus.

* * * * *